March 27, 1951  J. H. ELLIS  2,546,588
FISHING SHELTER OR THE LIKE
Filed April 29, 1946  2 Sheets-Sheet 1
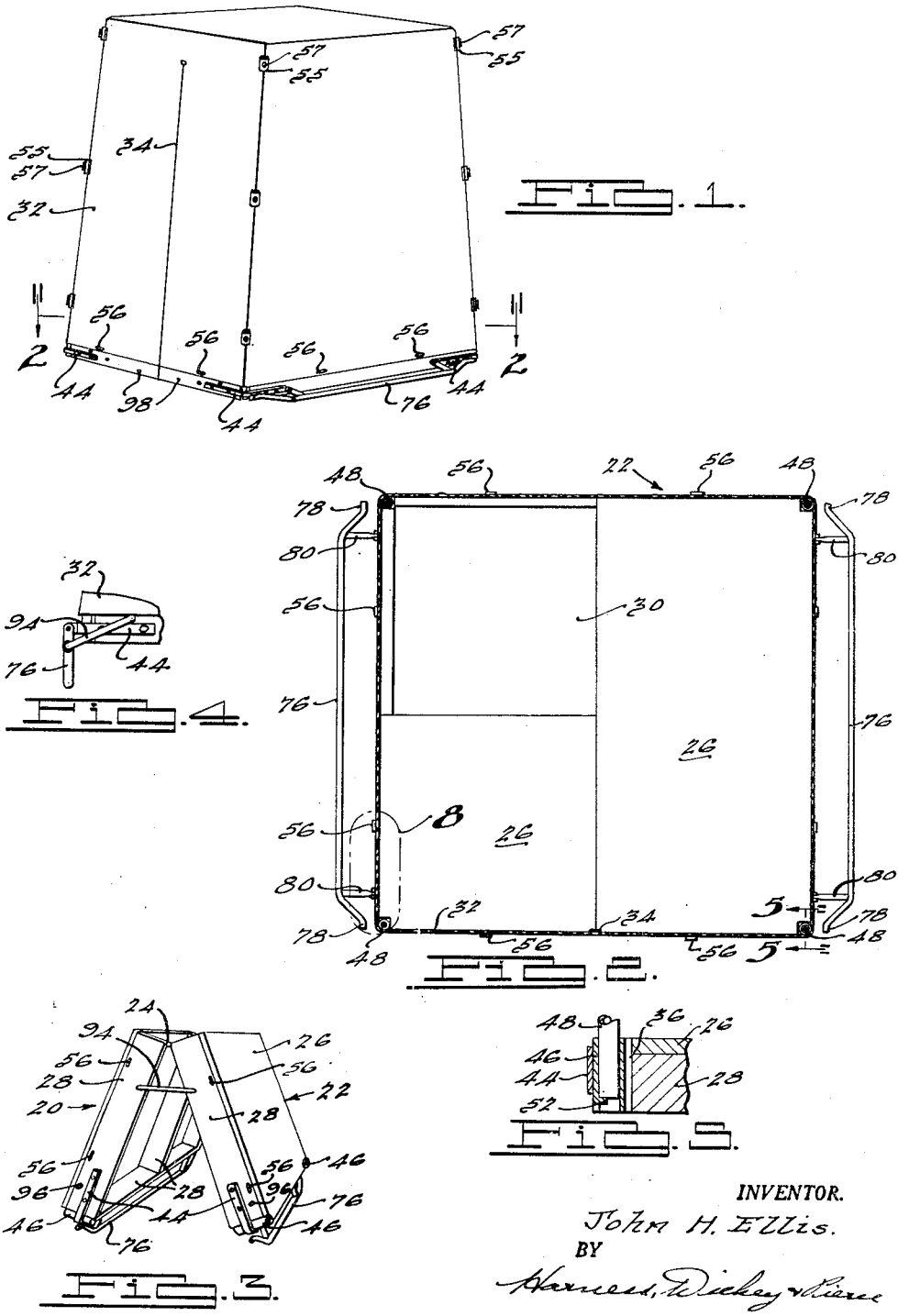
INVENTOR.
John H. Ellis.
BY
Harness, Dickey & Pierce
ATTORNEYS.

March 27, 1951  J. H. ELLIS  2,546,588
FISHING SHELTER OR THE LIKE
Filed April 29, 1946  2 Sheets-Sheet 2
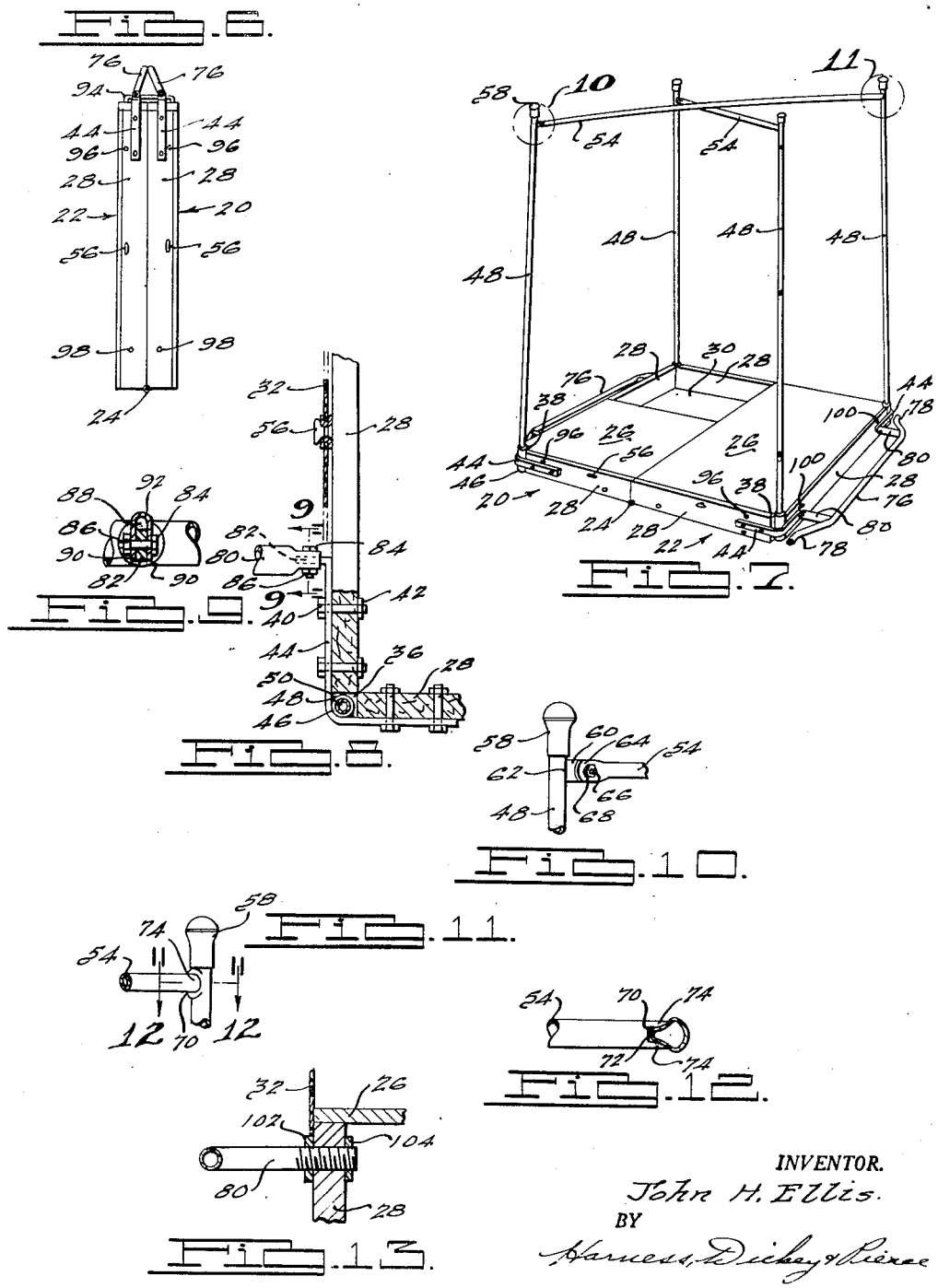
INVENTOR.
John H. Ellis.
BY
Harness, Dickey & Pierce
ATTORNEYS.

Patented Mar. 27, 1951

2,546,588

UNITED STATES PATENT OFFICE 2,546,588

FISHING SHELTER OR THE LIKE

John H. Ellis, Detroit, Mich.

Application April 29, 1946, Serial No. 665,727

9 Claims. (Cl. 280—20)

This invention relates broadly to new and useful improvements in fishing shelters and the like.

An important object of the invention is to provide a fishing shelter that can be easily and quickly set up or taken down.

Another object of the invention is to provide a fishing shelter which, when knocked down or disassembled, fits easily in the trunk of a conventional passenger car.

Still another object of the invention is to provide a fishing shelter equipped with ice runners which are uniquely mounted to support the same for movement across the ice in either an assembled or knocked-down condition.

Yet another object of the invention is to provide an ice shelter in which the floor is made up of foldable sections and the runners provide a handle therefor when the sections are folded together.

A further object of the invention is to provide a fishing shelter having a tent covering and which includes unique means for holding the tent associated with the supporting structure.

A still further object of the invention is to provide a collapsible and portable fishing shelter which has a minimum number of parts.

A yet further object of the invention is to provide a collapsible and portable fishing shelter that is simple in construction and relatively inexpensive to manufacture.

Other objects and advantages of the invention will be apparent during the course of the following description.

In the drawings forming a part of this specification and wherein like numerals are employed to designate like parts throughout the same, Fig. 1 is a perspective view showing a fishing shelter embodying the invention assembled and ready for use, Fig. 2 is a transverse sectional view taken on the line 2—2 of Fig. 1, Fig. 3 is a perspective view showing the hinged floor sections of the shelter partially folded or collapsed and with the runners positioned to support the same, Fig. 4 is a fragmentary, end elevational view illustrating the manner in which the runners are positioned and fastened to support the fully set up or assembled shelter for movement across the ice, Fig. 5 is an enlarged, fragmentary, vertical sectional view taken on the line 5—5 of Fig. 2, Fig. 6 is an end elevational view showing the hinged floor sections folded together and the runners positioned to provide a handle therefor, Fig. 7 is a perspective view showing the shelter fully assembled except for the tent covering, Fig. 8 is an enlarged view of the portion of Fig. 2 enclosed in the circle 8, parts thereof being broken away and shown in section for clearness of illustration, Fig. 9 is a fragmentary, vertical sectional view taken on the line 9—9 of Fig. 8, Fig. 10 is an enlarged elevational view of the portion of Fig. 7 enclosed in the circle 10, Fig. 11 is an enlarged view of the portion of Fig. 7 enclosed in the circle 11, Fig. 12 is a transverse sectional view taken on the line of 12—12 of Fig. 11, and Fig. 13 is a fragmentary, vertical sectional view through the free or swinging edge of a floor section and showing a modified type of runner attached thereto.

In the accompanying drawings, wherein for the purpose of illustration is shown a preferred embodiment of the invention, the numerals 20 and 22 designate generally similar rectangular floor sections which are attached together by conventional strap-type hinges 24 and form an essentially square floor structure when spread apart or extended, as shown in Figs. 2 and 7. Each of the floor sections 20 and 22 preferably is made of wood and comprises a top panel 26 and supporting joists 28. The panels 26 are nailed or otherwise attached to the joists 28 which extend along the outer edges and under the middle portion thereof wherever necessary to assure a rigid structure. In this connection it will be observed that hinges 24 are fastened to the lower edges of the end joists 28. Thus the floor sections 20 and 22 can be folded downwardly and together as shown in Fig. 6, but the abutting ends of the joists assure a rigid floor structure when the floor sections are extended. One of the floor panels 26 is provided with a suitable opening 30 through which persons in the shelter can fish through the ice.

Mounted on the floor structure is a removable and collapsible framework over which is stretched a tent 32 of canvas or the like. Access is had to and from the tent 32 through a vertical slit 34 in one of the side walls and this slit preferably is equipped with a conventional zipper closure that can be operated either from within or outside the shelter. In practice, the framework is demountable from the floor structure and separable from the tent 32. Since the device is usually transported in knocked-down condition to or from the fishing site and set up or disassembled in situ frequently under inclement weather conditions, the construction of the supporting framework and the manner in which it is mounted on and associated with the floor structure is an important feature of the invention. It is desirable that the knocked-down construction comprise as few parts as possible in order to minimize danger of their being lost or misplaced, that the parts be light in weight to facilitate transportation, and that they be susceptible of easy and rapid assembly or disassembly under all kinds of weather conditions. It is essential that the assembled shelter be rigid and sturdy to withstand the elements as well as normal treatment and abuse.

According to the present invention the outer joists 28 of each floor section are arranged so that their ends define vertical recesses 36 at each corner of the floor structure (Fig. 8), and the floor panels 26 are provided with notches 38 which register with and complement the recesses. Fastened to the joists 28 by bolts 40 and nuts 42 are angular metal straps 44 which reinforce and strengthen the corners of the floor structure and extend across the recesses 36 to provide strong and rigid supports for vertical bearings 46. These bearings are disposed in recesses 36 and snugly receive the lower terminal portions of the vertical supports 48.

In the interest of simplicity and economy of construction both the bearings 46 and supports 48 preferably comprise sections of ordinary metal pipe of a suitable length and diameter. The bearings 46 are welded, as at 50, or otherwise fastened to the inner sides of straps 44 and, in order to provide a solid seat for the lower ends of the supports 48, a tongue of metal 52 is struck and bent inwardly, as shown in Fig. 5, from the lower portion of each bearing. In this connection it should be noted that bearings 46 fit entirely within their respective recesses so that they do not project or otherwise interfere when the supports 48 are removed and the floor sections 20 and 22 folded together. Moreover, bearings 46 are not easily damaged or loosened by ordinary handling and abuse since they are sheltered by floor sections 20 and 22 and protected by the straps 44.

Adjacent the upper ends of supports 48 and extending diagonally therebetween is a pair of inherently flexible tubular braces 54. When the shelter is erected these braces are sprung longitudinally and, by reason of their inherently resilient nature, hold the supports 48 pressed outwardly against the side wall of tent 32 and the latter stretched tautly over the framework. It will be observed that one of the braces 54 is disposed slightly lower than the other so that they lie athwart each other and in substantially parallel, horizontal planes without interference. Each of the braces 54 is pivoted at one end to one of the upright supports 48 and its other end merely abuts against and is held by frictional engagement with the opposite support. When the superstructure is disassembled, braces 54 hang downwardly alongside the supports to which they are attached.

To assemble the superstructure on the supporting floor the latter is spread apart or extended and the upright supports 48 are inserted in their respective bearings 46. The tent 32 may be separate from the framework but preferably is permanently fastened to supports 48 by clamping plates 55 and screws 57. These plates conveniently can be made from pipe sections of suitable diameter. After the supports 48 are mounted on the floor the lower edge of tent 32 is fastened thereto by suitable turn-type fasteners 56 or the like. Cross braces 54 are then swung upwardly to spread the supports and tautly stretch the tent. As suggested, the braces 54 preferably are sufficiently long so that they are flexed or sprung longitudinally by this operation and by their inherently resilient action maintain sufficient pressure against the opposite or unattached supports to prevent inadvertent or accidental disengagement thereof. On the upper ends of supports 48 are rubber tips 58 which protect the upper corners of the tent.

Fig. 10 shows a preferred means for pivotally attaching the braces 54 to the supports 48. Metal lugs 60 welded, as at 62, to two of the supports 48 project laterally and form pivot supports for the braces. The attached ends of braces 54 are flattened, as at 64, and pivotally fastened to their respective lugs 60 by bolts 66 and nuts 68.

Figs. 11 and 12 illustrate a unique and exceedingly efficacious means for releasably securing the free ends of braces 54 to the opposed supports 48. As best shown in Fig. 12, each of these supports is partially collapsed longitudinally by means of a vise or the like to provide a laterally extending outwardly tapered protuberance 70, and the protuberances are located so that they are engaged by the braces 54 when the latter are disposed horizontally, as shown in Fig. 7. In the free or swinging ends of braces 54 are notches 72 which define spaced longitudinal prongs 74. When notches 72 are forced over the protuberances 70 the tapered sides of the latter wedge against the prongs 74 to supplement the action of the flexed braces in holding the free ends of the braces fast to their respective supports. This arrangement holds the superstructure assembled under any normal treatment or abuse but at the same time the parts are readily releasable and demountable so that the shelter can be quickly taken down.

Another feature of the invention resides in the provision of runners 76 at opposite sides of the floor structure and parallel to the fold joint. These runners preferably are tubular in form and conveniently can be made from suitable pipe sections. In order properly to support the shelter runners 76 extend substantially the entire width of the floor and in order to assure a smooth gliding action over rough or uneven surfaces the end portions of the runners are offset as at 78. Behind the offset portions 78 are lateral supporting arms 80 which arms are attached to pivot supports 82 by bolts 84 and nuts 86.

In this connection, it should be noted that pivot supports 82 are formed by bending one end of each strap 44 outwardly, as best shown in Fig. 8. Thus, the straps 44 not only reinforce the floor structure, protect the bearings 46 and support the assembled superstructure, but they also provide pivot supports for the runners 76. This multiple function of parts holds weight to a minimum, promotes economy of construction, and makes the finished structure compact and exceedingly strong and durable in use.

It is desirable that the runners extend horizontally in the plane of the floor section, as shown in Fig. 7, or downwardly at right angles thereto, as shown in Fig. 4. For reasons presently to be apparent it is equally desirable that the runners be held against pivotal movement upwardly from the horizontal position. According to the present invention, the lateral supporting arms 80 are made tubular in form and welded or otherwise attached to runners 76. The terminal or free end portion of each arm 80 is flattened, as by squeezing the same in a vise, to provide flat parallel side walls 90 with the plane of thickness perpendicular to the length of the runner, and until the interior width of the flattened end is just enough to receive the pivot supports 82 therebetween. The bottom portion of such flattened end is then removed to bring it to the condition shown in Fig. 9. The end thus formed provides a recess 88 which opens through the end and one side of each such arm. These recesses 88 receive pivot supports 82 as shown in Fig. 9, and the side walls 90 are held in pressed frictional engagement therewith by the bolts 84 and nuts 86. The top surfaces 92 of the flattened ends bear downwardly against the pivot supports 82 to prevent the runners 76 from swinging upwardly from horizontal positions; however, the runners are freely movable downwardly from horizontal positions to the positions shown in Fig. 4. Friction between the arms 80 and pivot supports 82 should be sufficient to sustain the weight of runners 76 and hold the latter normally positioned horizontally as shown in Fig. 1.

By reason of this unique construction and arrangement of parts, the shelter can be easily set up or taken down in approximately thirty seconds. To set up or assemble the shelter it is merely necessary to unfold the floor structure with runners 76 extended so that sections 20 and 22 rest flatly on the ice or other supporting surface, fit the four upright supports 48 in their respective sockets 46, secure the lower edge of tent 32 by the turn-type fasteners 56, and then force the braces 54 into the horizontal, locking positions shown in Fig. 7. The shelter is strong and rigid and is sufficiently weatherproof so that the smaller size shelters can be heated comfortably by a small lantern.

If it is desired to move the shelter from one place to another while set up or assembled, runners 76 are swung downwardly substantially at right angles to the floor structure and secured by U-shaped latch bars 94, as shown in Fig. 4. One inturned end of each bar 94 is inserted in the open end of a runner 76 and the other end thereof is inserted in a suitably located opening 96 provided in the adjacent joist 28. If desired, latch bars 94 may be used at both ends of the runners 76 but one is generally sufficient. These bars hold the runners solidly positioned to support the shelter and can be easily and quickly applied or removed.

Under certain conditions, as for example when transporting the shelter across the ice from a car to the fishing site, the parts can best be handled knocked down or disassembled. To transport the shelter in this manner, floor sections 20 and 22 are positioned in acute angular relation, as shown in Fig. 3, and runners 76 are extended so that they support the sections on the ice. The U-shaped latch bars 94 are employed to hold the floor sections thus positioned and for this purpose the joists 28 are provided adjacent to their hinged ends with holes 98 which receive the bars. The weight of floor sections 20 and 22 on the runners 76 tends to hold the latter in the open or extended position. Braces 54 are folded alongside their respective supports 48 and all four supports are wrapped in the tent 32 and placed on the hinged ends of the floor sections. It will be observed that, when floor sections 20 and 22 are positioned as shown in Fig. 3, the hinged ends define a V-shaped trough which retains the bundle and prevents it from rolling off the partially folded floor structure during transportation. With the parts thus positioned and assembled, they can be easily pushed across the ice to any desired location.

For transporting the shelter over a surface which will not permit use of runners 76, the floor sections 20 and 22 are folded together, as shown in Fig. 6, and held in this position by the U-shaped bars 94 which fit in suitably positioned openings 100 provided in the outer joists 28. When the floor sections are thus positioned runners 76 fold together to provide a handle.

While the pivotally mounted runners 76 hereinabove described are desirable and have numerous advantages over a fixed runner they may be mounted as shown in Fig. 13. In this modification of the invention, the arms 80 are cylindrical for their entire length. Their distal ends extend through the outer joists 28 and are threaded to receive the threaded washers 102 and nuts 104. It will be observed that the washers 102 and nuts 104 are disposed at opposite sides of the joists 28 and when tightened hold the runners affixed solidly thereto. Manifestly, the fixed runners 102 will support the floor structure when sections 20 and 22 are partially folded as shown in Fig. 3, and will provide handles therefor when the sections are folded together as shown in Fig. 6.

It is to be understood that the forms of the invention herewith shown and described are to be taken as preferred examples of the same and that various changes in the size, shape and arrangement of parts may be resorted to without departing from the spirit of the invention or the scope of the appended claims.

Having thus described the invention, I claim:

1. A collapsible and portable fishing shelter including hinged floor sections; runners pivotally attached to the free outer edges of said sections, each of said runners movable to a position in the plane of the floor section to which it is attached or to a position substantially at right angles thereto; and means for holding the runners in either of said positions.

2. A collapsible and portable fishing shelter comprising hinged sections which may be folded together or extended to form a floor structure; ice runners pivoted on the free or swinging edges of said sections, each of said runners movable to a position in the plane of the section to which it is attached or to a position substantially at right angles thereto; and latch means adapted either to hold the floor sections in partially folded positions or to hold the runners in said right angular position.

3. A collapsible and portable fishing shelter comprising articulated floor sections adapted to be folded together; ice runners at the free or swinging edges of said floor sections; pivot connections fastening the runners to their respective floor sections, said runners adapted to extend horizontally in the planes of the floor sections or to be folded downwardly substantially at right angles thereto, and said pivot connections including means for preventing pivotal movement of the runners upwardly from said horizontal positions; and means for holding the floor sections in partially folded positions, the arrangement being such that the extended runners support the partially folded floor sections and the weight of the sections holds the runners extended.

4. A collapsible and portable fishing shelter comprising articulated floor sections, said sections similar in size and shape and adapted to be folded together; and pivoted ice runners fastened to the free or swinging edges of and extending in the plane of the floor sections, said runners adapted to support the extended floor sections on the ice and, when the floor sections are folded together, said runners adapted to swing about their pivots and into proximity with each other whereby to form a handle therefor.

5. A collapsible and portable fishing shelter comprising a floor structure; pivot supports on opposite sides of said floor structure; a pair of ice runners each having lateral supporting arms and each of said arms provided with a socket which opens through the end and one side thereof, said sockets fitting downwardly over respective pivot supports; and pivot pins attaching the arms to the pivot supports, whereby the runners are freely swingable downwardly from a horizontal position to support the floor structure but are restrained against upward movement by the top walls of said sockets which bear downwardly on the pivot supports.

6. A collapsible and portable fishing shelter comprising a floor structure; pivot supports on opposite sides of said floor structure; a pair of ice runners each having lateral supporting arms and each of said arms provided with a socket which opens through the end and one side thereof, said sockets fitting downwardly over respective pivot supports; and pivot means fastening the arms to the supports with the side walls of the socket in pressed frictional engagement with the sides of the supports and the top walls of the sockets positioned to bear downwardly on the supports and limit upward swinging movement of the runners.

7. A collapsible and portable fishing shelter comprising a floor structure; pivot supports on opposite sides of said floor structure; tubular sections shaped to provide ice runners and having laterally extending tubular supporting arms, the distal ends of said arms being partially collapsed and longitudinally slotted to provide sockets and said sockets fitting downwardly over respective pivot supports; and pivot pins connecting the arms to the pivot supports.

8. A collapsible and portable fishing shelter comprising a pair of generally similar floor sections arranged side by side and hinged together, said floor sections adapted to be folded together or extended to provide a floor for the shelter; ice runners carried by and extending from the free outer sides of and in the plane of the floor sections, said runners extending sufficiently beyond the mentioned sides of the sections to support the floor structure when the sections are partially folded together; and means for holding the floor sections rigidly in a partially folded position, the arrangement being such that when the sections are thus positioned, the floor structure is freely movable on said runners and the articulated ends of the sections define a trough in which adjuncts and accessories may be placed for transportation across the ice.

9. A collapsible and portable fishing shelter comprising a supporting structure including a floor, joists extending along the edges of said floor arranged with their ends spaced to define vertical recesses therebetween, angular metal straps extending across the recesses and fastened to adjacent ends of the joists at the corners of the floor structure, the end portions of the straps at opposite sides of the structure being extended outwardly to provide pivot supports, and ice runners pivoted on said pivot supports, said runners adapted to extend in the plane of the floor or downwardly substantially at right angles thereto to support the same.

JOHN H. ELLIS.

REFERENCES CITED

The following references are of record in the file of this patent:

UNITED STATES PATENTS

| Number | Name | Date |
|---|---|---|
| 1,669,778 | Procter | May 15, 1928 |
| 1,900,335 | Del Vecchio | Mar. 7, 1933 |
| 2,301,089 | Stevens | Nov. 3, 1942 |
| 2,415,343 | Dunn | Feb. 4, 1947 |

FOREIGN PATENTS

| Number | Country | Date |
|---|---|---|
| 159,416 | Germany | Mar. 27, 1905 |